(12) United States Patent
Nakao et al.

(10) Patent No.: US 11,145,886 B2
(45) Date of Patent: Oct. 12, 2021

(54) REDOX FLOW BATTERY

(71) Applicant: TOYO ENGINEERING CORPORATION, Tokyo (JP)

(72) Inventors: Takato Nakao, Narashino (JP); Uma Jaya Ravali Theeda, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 57 days.

(21) Appl. No.: 16/647,462

(22) PCT Filed: Sep. 10, 2018

(86) PCT No.: PCT/JP2018/033445
§ 371 (c)(1),
(2) Date: Mar. 13, 2020

(87) PCT Pub. No.: WO2019/054332
PCT Pub. Date: Mar. 21, 2019

(65) Prior Publication Data
US 2020/0280087 A1  Sep. 3, 2020

(30) Foreign Application Priority Data

Sep. 14, 2017 (JP) .............................. JP2017-176829

(51) Int. Cl.
*H01M 8/18* (2006.01)
*H01M 8/04186* (2016.01)
*H01M 8/04082* (2016.01)

(52) U.S. Cl.
CPC ....... *H01M 8/188* (2013.01); *H01M 8/04186* (2013.01); *H01M 8/04201* (2013.01)

(58) Field of Classification Search
CPC ............. H01M 8/188; H01M 8/04186; H01M 8/04201; H01M 8/2455
See application file for complete search history.

(56) References Cited

U.S. PATENT DOCUMENTS 6,475,661 B1 * 11/2002 Pellegri ............. H01M 8/04186
429/105
2014/0272485 A1 * 9/2014 Sha ........................ H01M 8/188
429/51
(Continued)

FOREIGN PATENT DOCUMENTS

JP        10-334938 A      12/1998
JP        2001-325983 A    11/2001
(Continued)

OTHER PUBLICATIONS

International Search Report for PCT Application No. PCT/JP2018/033445, dated Nov. 20, 2018 in 2 pages.

*Primary Examiner* — Stewart A Fraser
(74) *Attorney, Agent, or Firm* — Knobbe, Martens, Olson & Bear, LLP (57) ABSTRACT

Redox flow battery 1 includes cell stack 2, first positive-electrode tank 11, second positive-electrode tank 12, first negative-electrode tank 21, and second negative-electrode tank 22. Cell stack 2 is divided into a plurality of cell groups 3, each of which consists of a plurality of cells 4. The plurality of cell groups 3 are connected to first and second positive-electrode tanks 11, 12 such that a positive-electrode fluid containing positive-electrode active material flows in parallel through the plurality of cell groups 3, and are connected to first and second negative-electrode tanks 21, 22 such that a negative-electrode fluid containing negative-electrode active material flows in parallel through the plurality of cell groups 3. The plurality of cells 4 in each cell group 3 are connected to each other such that the positive-electrode fluid flows in series through a plurality of positive cells 5 and such that the negative-electrode fluid flows in series through a plurality of negative cells 6.

16 Claims, 5 Drawing Sheets

(56) References Cited

U.S. PATENT DOCUMENTS

2015/0093606 A1  4/2015 Chen et al.
2015/0255824 A1* 9/2015 Evans .................. H01M 8/184
                                                 429/418

FOREIGN PATENT DOCUMENTS

| JP | 2002-502101 A | 1/2002 |
| JP | 2007-188731 A | 7/2007 |
| JP | 2013-8642 A | 1/2013 |

* cited by examiner

REDOX FLOW BATTERY

CROSS-REFERENCE TO RELATED APPLICATIONS

This application is the U.S. National Phase under 35. U.S.C. § 371 of International Application PCT/JP2018/033445, filed Sep. 10, 2018, which claims priority to Japanese Patent Application No. 2017-176829, filed Sep. 14, 2017. The disclosures of the above-described applications are hereby incorporated by reference in their entirety.

TECHNICAL FIELD

The present invention relates to a redox flow battery that is charged and discharged through a redox reaction of positive-electrode active material and negative-electrode active material in a cell.

BACKGROUND ART

Conventionally, as a secondary battery for energy storage, a redox flow battery is known which is charged and discharged through a redox reaction of active materials contained in an electrolyte solution. The redox flow battery has features such as easy increase in capacity, long life, and accurate monitoring of its state of charge. Because of these features, in recent years, the redox flow battery has attracted a great deal of attention, particularly for application in stabilizing the output of renewable energy whose power production fluctuates widely or leveling the electric load.

In the meantime, to obtain a predetermined voltage, the redox flow battery is generally configured to include a cell stack having a plurality of cells that are stacked. However, such a configuration has a problem that a current loss (shunt current loss) is generated through the electrolyte solution. To reduce the shunt current loss and improve energy efficiency, for example, Patent Document 1 proposes a method of serially flowing an electrolytic solution through a plurality of cells constituting a cell stack. With this method, the shunt current loss is expected to be minimized because a short circuit due to the electrolyte solution is established only between the adjacent cells.

CITATION LIST

Patent Literature

Patent Literature 1: U.S. Pat. No. 6,475,661 B1

SUMMARY OF THE INVENTION

Technical Problem

In the method described in Patent Document 1, however, an excessive pressure drop occurs when the electrolyte solution passes through the cell stack, which leads to an increase in pump power required to transfer the electrolyte solution. Accordingly, the power consumption becomes large, which results in a difficulty to improve energy efficiency.

It is therefore an object of the present invention to provide a redox flow battery that achieves an improvement in overall energy efficiency.

Solution to Problem

To achieve the above-described object, a redox flow battery of the present invention is a redox flow battery that is charged and discharged through a redox reaction of positive-electrode active material and negative-electrode active material in a cell, and includes: a cell stack including a plurality of cells that are stacked, each of the cells including a positive cell that houses a positive electrode and that is supplied with a positive-electrode fluid containing the positive-electrode active material, and a negative cell that houses a negative electrode and that is supplied with a negative-electrode fluid containing the negative-electrode active material; a first positive-electrode tank for storing the positive-electrode fluid having a relatively low state of charge; a second positive-electrode tank for storing the positive-electrode fluid having a relatively high state of charge; a first negative-electrode tank for storing the negative-electrode fluid having a relatively low state of charge; and a second negative-electrode tank storing the negative-electrode fluid having a relatively high state of charge, wherein the cell stack is divided into a plurality of cell groups, each of which consists of the plurality of cells, wherein the plurality of cell groups are connected to the first positive-electrode tank and the second positive-electrode tank such that the positive-electrode fluid flows in parallel through the plurality of cell groups between the first positive-electrode tank and the second positive-electrode tank, and the plurality of cell groups are connected to the first negative-electrode tank and the second negative-electrode tank such that the negative-electrode fluid flows in parallel through the plurality of cell groups between the first negative-electrode tank and the second negative-electrode tank, and wherein the plurality of cells in each of the cell groups are connected to each other such that the positive-electrode fluid, that has flowed into each of the cell groups, passes in series through the plurality of positive cells and then flows out of each of the cell groups, and such that the negative-electrode fluid, that has flowed into each of the cell groups, passes in series through the plurality of negative cells and then flows out of each of the cell groups.

According to the redox flow battery, the fluids containing the active materials flow in series through the plurality of cells only within the cell group. Therefore, an increase in pump power due to an increase in pressure drop can be prevented as much as possible, while achieving a reduction in shunt current loss.

Advantageous Effects of Invention

As described above, the present invention can achieve an improvement in overall energy efficiency.

DESCRIPTION OF EMBODIMENTS

Hereinafter, embodiments of the present invention will be described with reference to the drawings.

First Embodiment

Figure 1A:
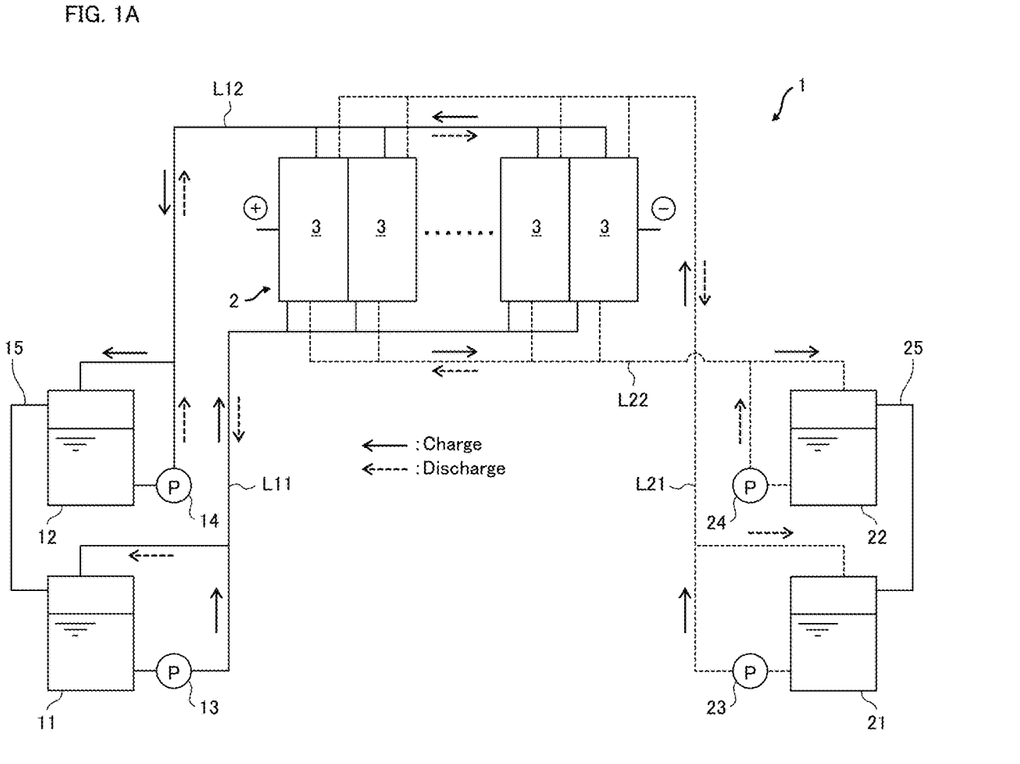
FIG. 1A is a schematic configuration diagram of a redox flow battery according to a first embodiment of the present invention.
Figure 1B:
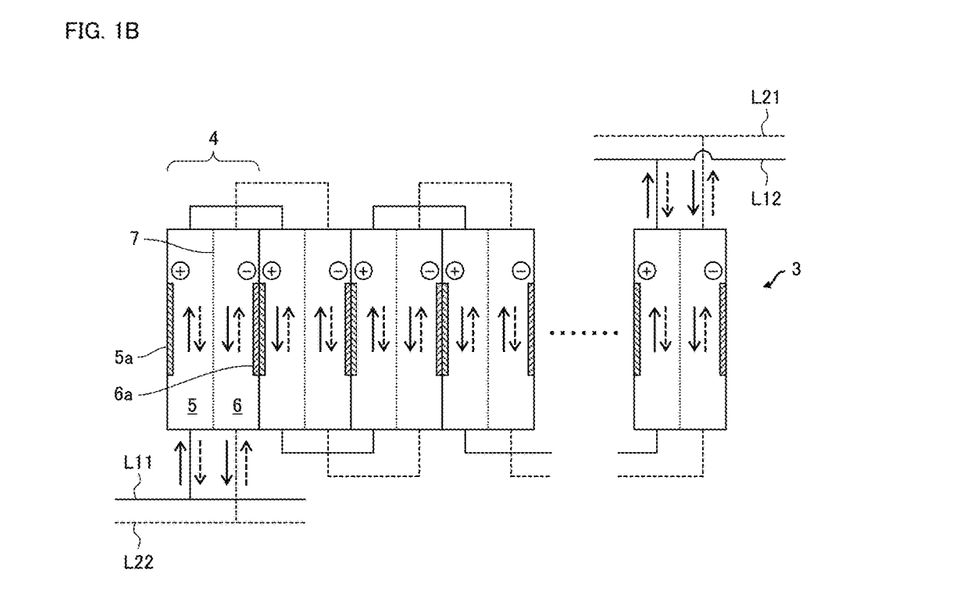
FIG. 1B is a schematic configuration diagram of a cell group constituting the redox flow battery according to the first embodiment.

FIG. 1A is a schematic configuration diagram of a redox flow battery according to a first embodiment of the present invention. FIG. 1B is a schematic configuration diagram of a cell group of the redox flow battery according to this embodiment.

Redox flow battery 1 is configured to be charged and discharged through a redox reaction of positive-electrode active material and negative-electrode active material in cell 4, and includes cell stack 2 having a plurality of cells 4 that are stacked. In this embodiment, cell stack 2 is divided into a plurality of cell groups 3, each of which consists of a plurality of cells 4.

Each of cells 4 includes positive cell 5 that houses positive electrode 5a and that is supplied with a fluid containing the positive-electrode active material (i.e. positive-electrode fluid), negative cell 6 that houses negative electrode 6a and that is supplied with a fluid containing the negative-electrode active material (i.e. negative-electrode fluid), and membrane 7 that separates positive cell 5 from negative cell 6. In positive cell 5, during a charge process, an oxidation reaction occurs in which the positive-electrode active material changes from a reduced state to an oxidized state, and during a discharge process, a reduction reaction occurs in which the positive-electrode active material changes from the oxidized state to the reduced state. In other words, in positive cell 5, the state of charge of the positive-electrode fluid is increased by the charge process and is decreased by the discharge process. In negative cell 6, on the other hand, during the charge process, the reduction reaction occurs in which the negative-electrode active material changes from the oxidized state to the reduced state, and during the discharge process, the oxidation reaction occurs in which the negative-electrode active material changes from the reduced state to the oxidized state. In other words, in negative cell 6, the state of charge of the negative-electrode fluid is increased by the charge process and is decreased by the discharge process.

The terms "positive-electrode fluid" and "negative-electrode fluid" used herein mean any fluid containing a positive-electrode active material and any fluid containing a negative-electrode active material, respectively, and are not limited to an electrolyte solution of the active material. For example, the positive-electrode fluid may be a slurry formed by suspending and dispersing a granular positive-electrode active material in a liquid phase, or may be a liquid positive-electrode active material itself. The same applies to the negative-electrode fluid.

The state of charge (SOC) is an index indicating the degree (depth) of charge, and depends on the amounts of the oxidized-state active material and the reduced-state active material in the fluid. The SOC can be defined from various perspectives, and for example, the amounts of the active materials can be used to express the SOC of the fluid. In this case, the SOC of the positive-electrode fluid can be expressed as a ratio of the concentration of the oxidized-state active material to the sum of the concentrations of the oxidized-state active material and the reduced-state active material in the fluid. On the other hand, the SOC of the negative-electrode fluid can be expressed as a ratio of the concentration of the reduced-state active material to the sum of the concentrations of the oxidized-state active material and the reduced-state active material in the fluid. The SOC of the positive-electrode fluid becomes higher as the charge process (oxidation reaction) proceeds to decrease the reduced-state positive-electrode active material and to increase the oxidized-state positive-electrode active material, and becomes lower as the discharge process (reduction reaction) proceeds to decrease the oxidized-state positive-electrode active material and to increase the reduced-state positive-electrode active material. On the other hand, the SOC of the negative-electrode fluid becomes higher as the charge process (reduction reaction) proceeds to decrease the oxidized-state negative-electrode active material and to increase the reduced-state negative-electrode active material, and becomes lower as the discharge process (oxidation reaction) proceeds to decrease the reduced-state negative-electrode active material and to increase the oxidized-state negative-electrode active material.

In this embodiment, the positive-electrode fluid whose SOC is relatively low after the discharge process and the positive-electrode fluid whose SOC is relatively high after the charge process are stored separately. Similarly, the negative-electrode fluid whose SOC is relatively low after the discharge process and the negative-electrode fluid whose SOC is relatively high after the charge process are stored separately. Specifically, redox flow battery 1 includes first positive-electrode tank 11 for storing the positive-electrode fluid having a relatively low SOC, second positive-electrode tank 12 for storing the positive-electrode fluid having a relatively high SOC, first negative-electrode tank 21 for storing the negative-electrode fluid having a relatively low SOC, and second negative-electrode tank 22 for storing the negative-electrode fluid having a relatively high SOC. In other words, first positive-electrode tank 11 stores the positive-electrode fluid containing a relatively large amount of the reduced-state positive-electrode active material as compared with the oxidized-state positive-electrode active material, and second positive-electrode tank 12 stores the positive-electrode fluid containing a relatively large amount of the oxidized-state positive-electrode active material as compared with the reduced-state positive-electrode active material. First negative-electrode tank 21 stores the negative-electrode fluid containing a relatively large amount of the oxidized-state negative-electrode active material as compared with the negative-electrode active material in the reduced state, and second negative-electrode tank 22 stores the negative-electrode fluid containing a relatively large amount of the reduced-state negative-electrode active material as compared with the oxidized-state negative-electrode active material.

The plurality of cell groups 3 constituting cell stack 2 are connected in parallel to each other between first positive-electrode tank 11 and second positive-electrode tank 12, and are connected in parallel to each other between first negative-electrode tank 21 and second negative-electrode tank 22. Specifically, the plurality of cell groups 3 are connected to first positive-electrode tank 11 through first positive-electrode flow pipe L11, and are connected to second positive-electrode tank 12 through second positive-electrode flow pipe L12. The plurality of cell groups 3 are connected to first negative-electrode tank 21 through first negative-electrode flow pipe L21, and are connected to second negative-electrode tank 22 through second negative-electrode flow pipe L22.

On the other hand, the plurality of cells 4 in each cell group 3 are connected to each other such that the positive-electrode fluid flows in series through the plurality of positive cells 5 and the negative-electrode fluid flows in series through the plurality of negative cells 6. Specifically, the plurality of positive cells 5 form a series flow path that communicates first positive-electrode flow pipe L11 and second positive-electrode flow pipe L12, and the plurality of negative cells 6 form a series flow path that communicates first negative-electrode flow pipe L21 and second negative-electrode flow pipe L22.

In this embodiment, a pump is used as a means for circulating the positive-electrode fluid between first positive-electrode tank 11 and second positive-electrode tank 12. Specifically, first positive-electrode flow pipe L11 is provided with first positive-electrode pump 13 for delivering the positive-electrode fluid in first positive-electrode tank 11 to second positive-electrode tank 12, and second positive-electrode flow pipe L12 is provided with second positive-electrode pump 14 for delivering the positive-electrode fluid in second positive-electrode tank 12 to first positive-electrode tank 11. Except for some special pumps, it is difficult to cause the fluid to flow back through the pump from its discharge side to its suction side. Therefore, first positive-electrode flow pipe L11 is preferably divided into two branches to be connected to first positive-electrode tank 11, one of which is provided with first positive-electrode pump 13, as shown in the figure. Second positive-electrode flow pipe L12 is also preferably divided into two branches to be connected to second positive-electrode tank 12, one of which is provided with and second positive-electrode pump 14, as shown in the figure. For example, a valve may be provided in each of the branch pipes or a three-way check valve may be provided at the branching point, so that the flow direction of the positive-electrode fluid can be changed when switching between the charge and the discharge.

Similarly, in this embodiment, a pump is used as a means for circulating the negative-electrode fluid between first negative-electrode tank 21 and second negative-electrode tank 22. Specifically, first negative-electrode flow pipe L21 is provided with first negative-electrode pump 23 for delivering the negative-electrode fluid in first negative-electrode tank 21 to second negative-electrode tank 22, and second negative-electrode flow pipe L22 is provided with second negative-electrode pump 24 for delivering the negative-electrode fluid in second negative-electrode tank 22 to first negative-electrode tank 21. Except for some special pumps, it is difficult to cause the fluid to flow back through the pump from its discharge side to its suction side. Therefore, first negative-electrode flow pipe L21 is preferably divided into two branches to be connected to first negative-electrode tank 21, one of which is provided with first negative-electrode pump 23, as shown in the figure. Second negative-electrode flow pipe L22 is also preferably divided into two branches to be connected to second negative-electrode tank 22, one of which is provided with second negative-electrode pump 24. For example, a valve may be provided in each of the branch pipes or a three-way check valve may be provided at the branching point, the flow direction of the negative-electrode fluid can be changed when switching between the charge and the discharge.

The charge process of redox flow battery 1 is performed as described below. First, the positive-electrode fluid in first positive-electrode tank 11 is supplied to positive cell 5 through first positive-electrode flow pipe L11, and the negative-electrode fluid in first negative-electrode tank 21 is supplied to negative cell 6 through first negative-electrode flow pipe L21. In positive cell 5, the oxidation reaction proceeds continuously in which the reduced-state positive-electrode active material contained in the positive-electrode fluid changes into the oxidized state, and in negative cell 6, the reduction reaction proceeds continuously in which the oxidized-state negative-electrode active material contained in the negative-electrode fluid changes into the reduced state. In this manner, the battery is charged through the redox reaction in positive cell 5 and negative cell 6. Then, the positive-electrode fluid containing the positive-electrode active material that has changed into the oxidized state by the charge process is stored in second positive-electrode tank 12 through second positive-electrode flow pipe L12. The negative-electrode fluid containing the negative-electrode active material that has changed into the reduced state by the charge process is stored in second negative-electrode tank 22 through second negative-electrode flow pipe L22.

Further, the discharge process of redox flow battery 1 is performed as described below. First, the positive-electrode fluid in second positive-electrode tank 12 is supplied to positive cell 5 through second positive-electrode flow pipe L12, and the negative-electrode fluid in second negative-electrode tank 22 is supplied to negative cell 6 through second negative-electrode flow pipe L22. In positive cell 5, the reduction reaction proceeds continuously in which the oxidized-state positive-electrode active material contained in the positive-electrode fluid changes into the reduced state, and in negative cell 6, the oxidation reaction proceeds continuously in which the negative-electrode active material contained in the reduced-state negative-electrode fluid changes into the oxidized state. In this manner, the battery is discharged through the redox reaction in positive cell 5 and negative cell 6. Then, the positive-electrode fluid containing the positive-electrode active material that has changed into the reduced state by the discharge process is stored in first positive-electrode tank 11 through first positive-electrode flow pipe L11. The negative-electrode fluid containing the negative-electrode active material that has changed into the oxidized state by the discharge process is stored in first negative-electrode tank 21 through first negative-electrode flow pipe L21.

According to this embodiment, although the positive-electrode fluid flows in parallel through the plurality of cell groups 3 between first positive-electrode tank 11 and second positive-electrode tank 12, the positive-electrode fluid, that has flowed into each cell group 3, passes in series through the plurality of positive cells 5 and then flows out of each cell group 3. Similarly, although the negative-electrode fluid flows in parallel through the plurality of cell groups 3 between first negative-electrode tank 21 and second negative-electrode tank 22, the negative-electrode fluid, that has flowed into each cell group 3, passes in series through the plurality of negative cells 6 and then flows out of each cell group 3. In other words, since each of the fluids flows in series through the plurality of cells 4 only within cell group 3, a pressure drop which occurs when the fluid passes through cell stack 2 can be reduced, as compared with the case where it flows in series through all cells 4 in cell stack 2. Therefore, an increase in pump power to be required can be prevented as much as possible, while achieving a reduction in shunt current loss by serially flowing each of the fluids through the plurality of cells 4. As a result, the overall energy efficiency can be improved.

In this embodiment, the positive-electrode fluid whose SOC is relatively low after the discharge process and the positive-electrode fluid whose SOC is relatively high after the charge process are separately stored, and therefore they are not mixed to be supplied to positive cell 5. Similarly, the negative-electrode fluid whose SOC is relatively low after the discharge process and the negative-electrode fluid whose SOC is relatively high after the charge process are also stored separately, and therefore they are not mixed to be supplied to negative cell 6. Accordingly, in each of the charge and discharge processes, the fluid whose state of charge is constant can be supplied to cell 4, thereby also enabling stable operation of redox flow battery 1. For example, some redox flow batteries include one tank for storing a positive-electrode fluid and one tank for storing a negative-electrode fluid, wherein the fluid that has been supplied to cells is returned to the same tank as a tank in which it was originally stored. In such a redox flow battery, the state of charge of the fluid supplied to the cells changes with the progress of the charge/discharge process, and the charge/discharge performance changes accordingly. Therefore, to provide stable charge/discharge performance, it is necessary to adjust the amounts of the positive- and negative-electrode fluids that are supplied to the cells. In contrast to this, in this embodiment, even after the charge/discharge process proceeds, the state of charge of the fluid in each of tanks 11, 12, 21, 22 can be kept constant. In this case, the state of charge of the fluid supplied to cells 4 is also kept constant in each of the charge and discharge processes. As a result, stable charge/discharge performance can always be provided without adjusting the supply amounts as described above. This is advantageous in that, as pumps 13, 14, 23, 24 for delivering the active materials, a pump with a relatively small capacity can be selected, without consideration of the adjustment of the delivery amount as described above.

In the meantime, each of tanks 11, 12, 21, 22 is preferably filled with an inert gas (e.g. nitrogen gas) to prevent gas which may be generated by a side reaction (for, example, hydrogen), or any remaining atmospheric components (in particular, oxygen or carbon dioxide) from having adverse effects on different locations of redox flow battery 1. In this embodiment, to minimize the consumption of the inert gas, first positive-electrode tank 11 and second positive-electrode tank 12 are connected by positive-electrode pressure-equalizing pipe 15, and first negative-electrode tank 21 and second negative-electrode tank 22 are connected by negative-electrode pressure-equalizing pipe 25. Positive-electrode pressure-equalizing pipe 15 functions to equalize the pressure of the gas phase portion in first positive-electrode tank 11 with the pressure of the gas phase portion in second positive-electrode tank 12. Therefore, when the positive-electrode fluid is transferred between first positive-electrode tank 11 and second positive-electrode tank 12, the inert gas can be transferred in a direction opposite to the fluid transfer direction. Further, negative-electrode pressure-equalizing pipe 25 functions to equalize the pressure of the gas phase portion in first negative-electrode tank 21 with the pressure of the gas phase portion in second negative-electrode tank 22. Therefore, when the negative-electrode fluid is transferred between first negative-electrode tank 21 and second negative-electrode tank 22, the inert gas can be transferred in a direction opposite to the fluid transfer direction. This eliminates the need for wasteful discharge of the inert gas in each of tanks 11, 12, 21, 22 to the outside in response to the transfer of the positive- and negative-electrode fluids during the charge/discharge process, which enables a significant reduction in consumption of the inert gas.

Figure 2:
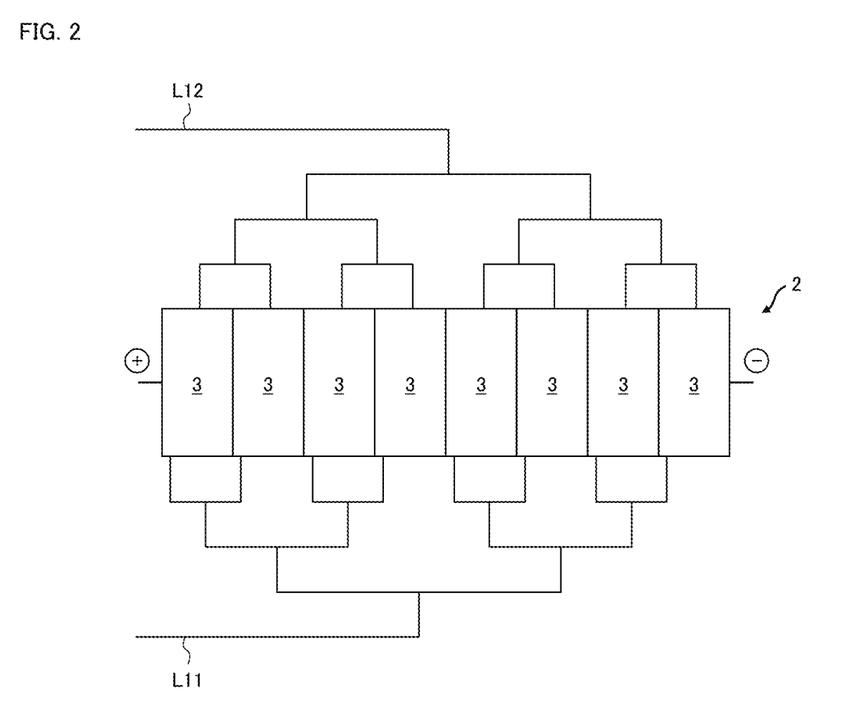
FIG. 2 is a schematic configuration diagram showing a variation of first and second positive-electrode flow pipes.

The connection between each of tanks 11, 12, 21, 22 and cell stack 2 is not limited to the illustrated one, as long as the positive- and negative-electrode fluids flow in parallel through the plurality of cell groups 3. FIG. 2 is a schematic configuration diagram showing a variation of the first and second positive-electrode flow pipes.

In the configuration shown in FIG. 1A, the pressure drops, which occur in first and second positive-electrode flow pipes L11, L12 between each of tanks 11, 12 and cell group 3, become larger as the distance between each of tanks 11, 12 and cell group 3 increases. As a result, in the plurality of cell groups 3 connected to first and second positive-electrode flow pipes L11, L12, the positive-electrode fluid may become more difficult to flow through cell group 3 as the distance from each of tanks 11, 12 increases. In other words, the positive-electrode fluid may flow unevenly through the plurality of cell groups 3. In contrast to this, in the variation shown in FIG. 2, each of first and second positive-electrode flow pipes L11, L12 is shaped like a tournament bracket that branches hierarchically from each of tanks 11, 12 toward the plurality of cell groups 3.

Therefore, the pressure drops from each of tanks 11, 12 to cell groups 3 are substantially equal, which can prevent the occurrence of uneven flow as described above to provide maximum charge/discharge performance. In addition, flow pipes L11, L12 having a shape like a tournament bracket as shown in FIG. 2 can further reduce the possibility of short circuit due to the positive-electrode fluid between cell groups 3, as compared with the configuration shown in FIG. 1A, thereby further reducing the shunt current loss. Obviously, such a shape like a tournament bracket is also applicable to first and second negative-electrode flow pipes L21, L22.

Figure 3A:
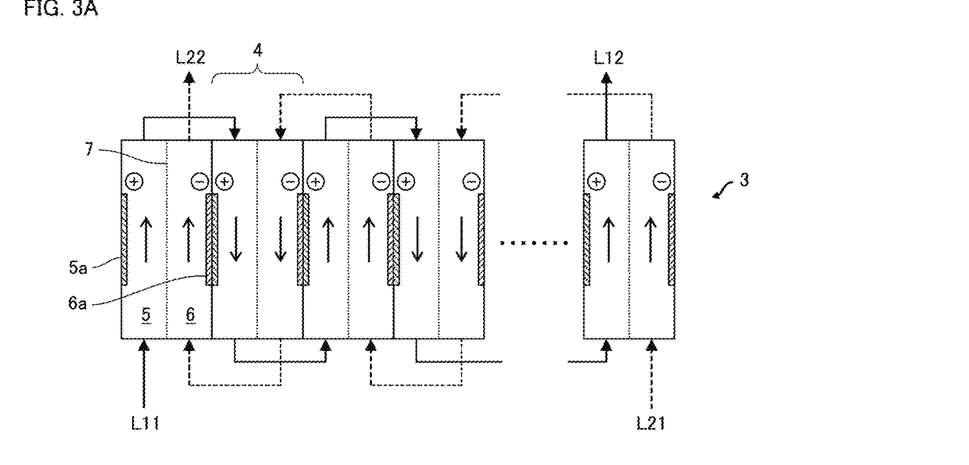
FIG. 3A is a schematic configuration diagram showing a variation of a flow path that connects a plurality of cells in a cell group.
Figure 3B:
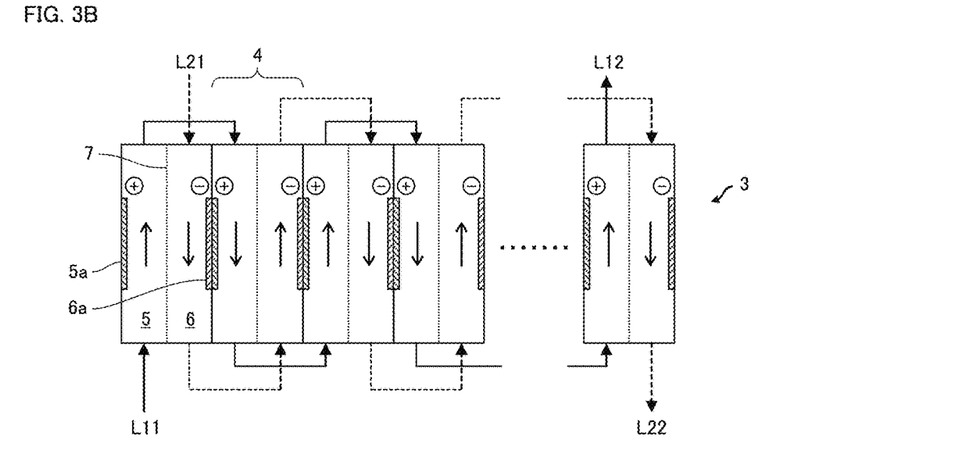
FIG. 3B is a schematic configuration diagram showing a variation of a flow path that connects a plurality of cells in a cell group.
Figure 3C:
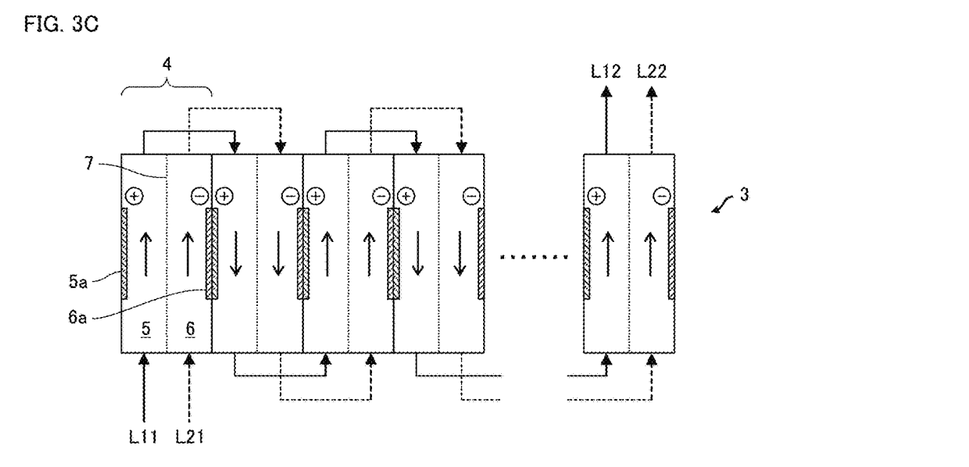
FIG. 3C is a schematic configuration diagram showing a variation of a flow path that connects a plurality of cells in a cell group.

On the other hand, the flow path configuration in cell group 3 is also not limited to the illustrated one, as long as the plurality of positive cells 5 form a series flow path and the plurality of negative cells 6 form a series flow path. FIGS. 3A to 3C are schematic configuration diagrams showing several variations of the flow path that connects the plurality of cells in the cell group. In FIG. 3A to FIG. 3C, the arrow indicates the flow directions of the fluids during the charge.

The flow path configuration shown in FIG. 3A differs from the flow path configuration shown in FIG. 1B in terms of the flow directions of the positive- and negative-electrode fluids within each cell 4. Specifically, in the flow path configuration shown in FIG. 1B, the positive- and negative-electrode fluids flow in opposite directions within each cell 4, whereas in the flow path configuration shown in FIG. 3A, the positive- and negative-electrode fluids flow in the same direction within each cell 4.

The flow path configuration shown in FIG. 3B differs from the flow path configuration shown in FIG. 1B in terms of positions of cells 4 in cell group 3 where each of the fluids flows into and out of. During the charge process, for example, in the flow path configuration shown in FIG. 1B, the positive-electrode fluid flows into cell 4 at one end of cell group 3 and flows out of cell 4 at the other end thereof, and the negative-electrode fluid flows into cell 4 at the other end of cell group 3 and flows out of cell 4 at the one end thereof. In contrast to this, in the flow path configuration shown in FIG. 3B, both the positive- and negative-electrode fluids flow into cell 4 at one end of cell group 3 and flow out of cell 4 at the other end thereof.

The flow path configuration shown in FIG. 3C differs from the flow path configuration shown in FIG. 1B in terms of the flow directions of the positive- and negative-electrode fluids within each cell 4, and differs from the flow path configuration shown in FIG. 3A in terms of positions of cells 4 in cell group 3 where each of the fluids flows into and out of. Specifically, in the flow path configuration shown in FIG. 1B, the positive- and negative-electrode fluids flow in opposite directions within each cell 4, whereas in the flow path configuration shown in FIG. 3C, the positive- and negative-electrode fluids flow in the same direction within each cell 4. Further, in the flow path configuration shown in FIG. 3A, the positive-electrode fluid flows into cell 4 at one end of cell group 3 and flows out of cell 4 at the other end thereof, and the negative-electrode fluid flows into cell 4 at the other end of cell group 3 and flows out of cell 4 at the one end thereof. In contrast to this, in the flow path configuration shown in FIG. 3C, both the positive- and negative-electrode fluids flow into cell 4 at one end of cell group 3 and flow out of cell 4 at the other end thereof.

Second Embodiment

Figure 4:
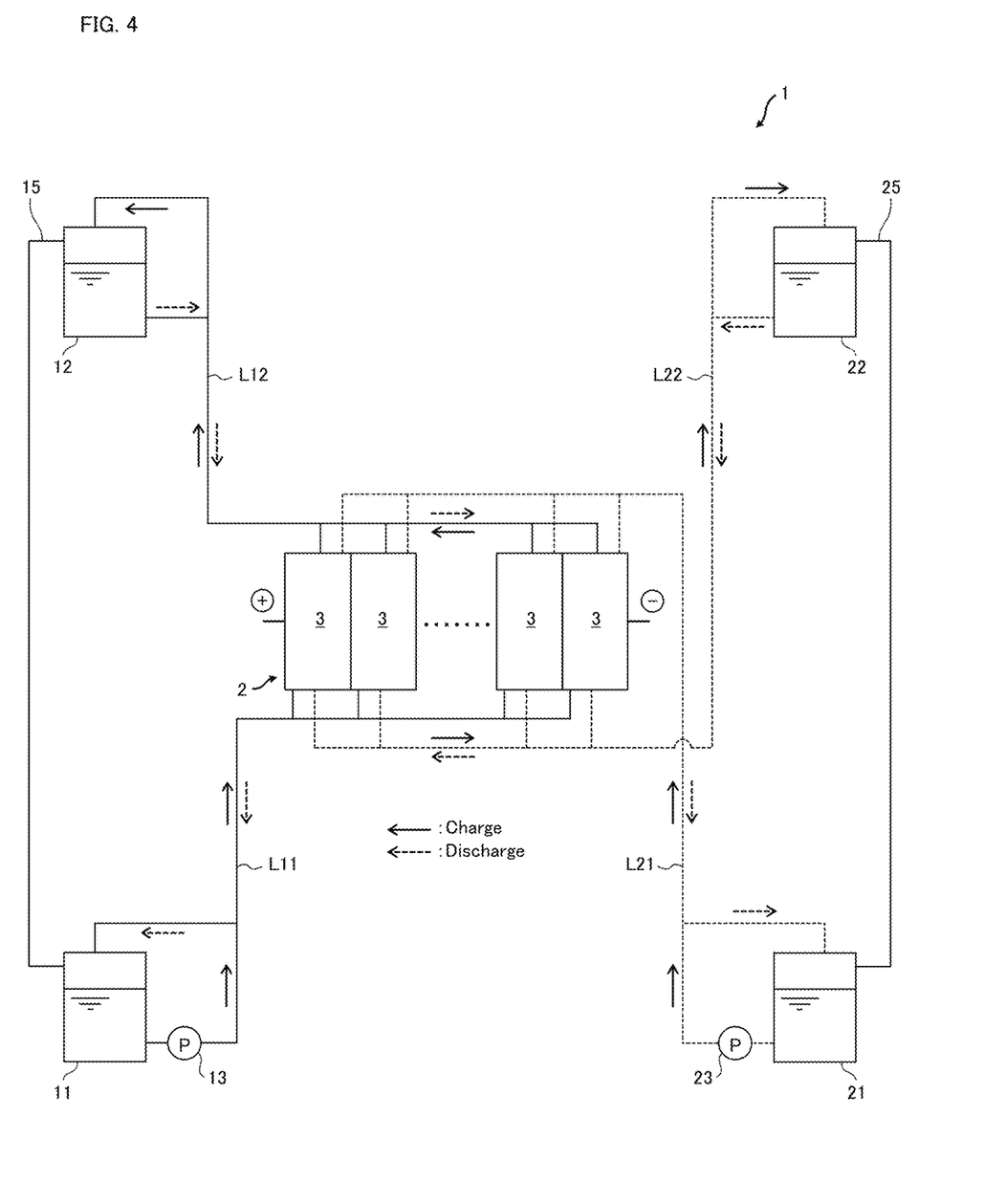
FIG. 4 is a schematic configuration diagram of a redox flow battery according to a second embodiment of the present invention.

FIG. 4 is a schematic configuration diagram of the redox flow battery according to a second embodiment of the present invention. Hereinafter, components identical to those of the first embodiment will be denoted by identical reference numerals in the drawings, description thereof will be omitted, and only components that are different from those of the first embodiment will be described.

This embodiment is a variation of the first embodiment, and differs from the first embodiment in that second positive-electrode pump 14 and second negative-electrode pump 24 of the first embodiment are omitted. Accordingly, in this embodiment, a hydraulic head difference is utilized as a method of transferring the positive-electrode fluid in second positive-electrode tank 12 and the negative-electrode fluid in second negative-electrode tank 22. Specifically, second positive-electrode tank 12 is positioned above first positive-electrode tank 11 so that a hydraulic head difference causes the flow of the positive-electrode fluid in second positive-electrode tank 12 to first positive-electrode tank 11. Second negative-electrode tank 22 is positioned above first negative-electrode tank 21 so that a hydraulic head difference causes the flow of the negative-electrode fluid in second negative-electrode tank 22 to first negative-electrode tank 21. The term "hydraulic head" as used herein means an elevation head of the positive-electrode fluid or the negative-electrode fluid.

With this configuration, no pump power is required to transfer the positive- and negative-electrode fluids during the discharge process, thereby making more effective use of energy. In addition, the configuration that utilizes such a hydraulic head difference is preferably applicable particularly to the case where the components of redox flow battery 1 (such as tanks and pump) are located inside a structure such as a three or more story building for the purpose of reducing the footprint of redox flow battery 1. Specifically, in the case where redox flow battery 1 is installed in a three or more story building, the footprint of redox flow battery 1 can be reduced when cell stack 2 is installed on a floor above a floor on which first positive-electrode tank 11 and first negative-electrode tank 21 are installed, and when second positive-electrode tank 12 and second negative-electrode tank 22 are installed on a floor above the floor on which cell stack 2 is installed. For such a building configuration, the method utilizing a hydraulic head difference according to this embodiment can be preferably used.

Second positive-electrode flow pipe L12 need not necessarily be divided into two branches to be connected to second positive-electrode tank 12. Second negative-electrode flow pipe L22 also need not necessarily be divided into two branches to be connected to second negative-electrode tank 22. In other words, in this embodiment where second positive-electrode pump 14 and second negative-electrode pump 24 are omitted, the branch pipes of each of second positive-electrode flow pipe L12 and second negative-electrode flow pipe L22 can be omitted. This is also advantageous in that each of second positive-electrode flow pipe L12 and second negative-electrode flow pipe L22 need not necessarily be provided with a valve or the like for switching the flow direction of the fluid.

Third Embodiment

Figure 5:
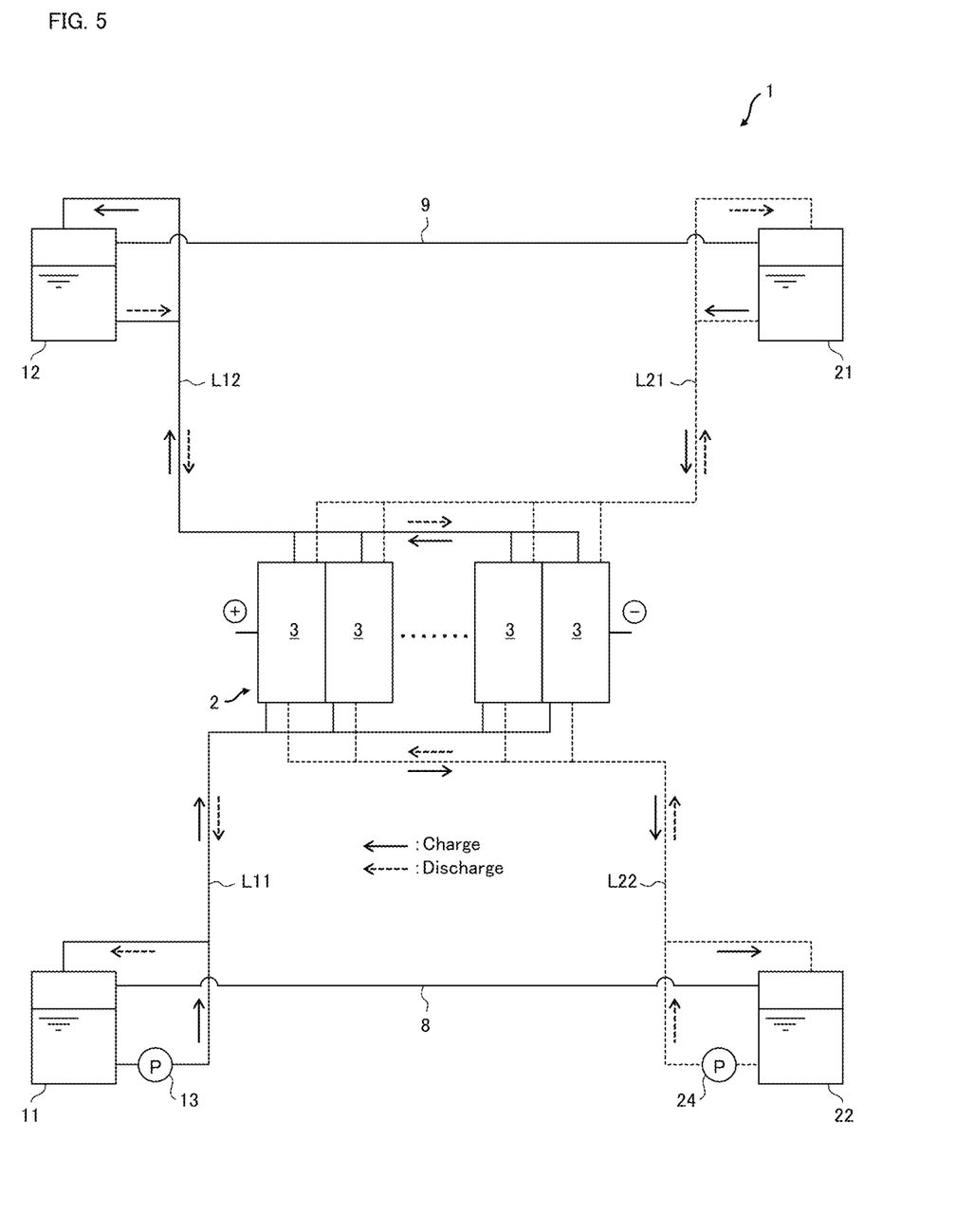
FIG. 5 is a schematic configuration diagram of the redox flow battery according to a third embodiment of the present invention.

FIG. 5 is a schematic configuration diagram of the redox flow battery according to a third embodiment of the present invention. Hereinafter, components identical to those of the above-described embodiments will be denoted by identical reference numerals in the drawings, description thereof will be omitted, and only components that are different from those of the above-described embodiments will be described.

This embodiment is a variation of the first embodiment, and differs from the first embodiment in that second positive-electrode pump 14 and first negative-electrode pump 23 of the first embodiment are omitted. Accordingly, in this embodiment, a pressure difference between the tanks is utilized as a method of transferring the positive-electrode fluid in second positive-electrode tank 12 and the negative-electrode fluid in first negative-electrode tank 21. Specifically, the pressure in second positive-electrode tank 12 is higher than that in first positive-electrode tank 11, and the pressure in first negative-electrode tank 21 is higher than that in second negative-electrode tank 22. Further, positive-electrode pressure-equalizing pipe 15 and negative-electrode pressure-equalizing pipe 25 of the first embodiment are omitted, and instead, low-pressure-side pressure-equalizing pipe 8 and high-pressure-side pressure-equalizing pipe 9 are provided. Low-pressure-side pressure-equalizing pipe 8 connects first positive-electrode tank 11 and second negative-electrode tank 22, and functions to equalize the pressure of the gas phase portion in first positive-electrode tank 11 with the pressure of the gas phase portion in second negative-electrode tank 22. High-pressure-side pressure-equalizing pipe 9 connects second positive-electrode tank 12 and first negative-electrode tank 21, and functions to equalize the pressure of the gas phase portion in second positive-electrode tank 12 with the pressure of the gas phase portion in first negative-electrode tank 21.

In the charge process of this embodiment, the positive-electrode fluid in first positive-electrode tank 11 is transferred to second positive-electrode tank 12 by first positive-electrode pump 13, whereas the negative-electrode fluid in first negative-electrode tank 21 is transferred to second negative-electrode tank 22 due to a pressure difference between first negative-electrode tank 21 and second negative-electrode tank 22. Similarly, in the discharge process of this embodiment, the negative-electrode fluid in second negative-electrode tank 22 is transferred to first negative-electrode tank 21 by second negative-electrode pump 24, whereas the positive-electrode fluid in second positive-electrode tank 12 is transferred to first positive-electrode tank 11 due to a pressure difference between second positive-electrode tank 12 and first positive-electrode tank 11.

Thus, in this embodiment, the number of pumps that operate during each of the charge and discharge processes can be reduced to one, thereby making more effective use of energy than the first embodiment. Further, both during the charge and discharge processes, low-pressure-side pressure-equalizing pipe 8 allows the exchange of inert gas between first positive-electrode tank 11 and second negative-electrode tank 22, and high-pressure-side pressure-equalizing pipe 9 allows the exchange of inert gas between second positive-electrode tank 12 and first negative-electrode tank 21. Therefore, also in this embodiment, wasteful discharge of the inert gas can be prevented, which enables a significant reduction in consumption of the inert gas.

To transfer the positive-electrode fluid in second positive-electrode tank 12 and the negative-electrode fluid in first negative-electrode tank 21, the method utilizing a hydraulic head difference according to the second embodiment may be used in combination with the method utilizing the pressure difference between the tanks. Specifically, second positive-electrode tank 12 may be positioned above first positive-electrode tank 11 so that a hydraulic head difference causes the flow of the positive-electrode fluid in second positive-electrode tank 12 to first positive-electrode tank 11. First negative-electrode tank 21 may be positioned above second negative-electrode tank 22 so that a hydraulic head difference causes the flow of the negative-electrode fluid in first negative-electrode tank 21 to second negative-electrode tank 22. The utilization of hydraulic head difference allows the pressures of the gas phase portions in second positive-electrode tank 12 and first negative-electrode tank 21 to be relatively lowered. The hydraulic head difference may be utilized for either second positive-electrode tank 12 or first negative-electrode tank 21. This is particularly effective when the pressure required for the positive-electrode fluid to flow is different from that required for the negative-electrode fluid to flow.

Second positive-electrode flow pipe L12 need not necessarily be divided into two branches to be connected to second positive-electrode tank 12. First negative-electrode flow pipe L21 also need not necessarily be divided into two branches to be connected to first negative-electrode tank 21. In other words, in this embodiment where second positive-electrode pump 14 and first negative-electrode pump 23 are omitted, the branch pipes of each of second positive-electrode flow pipe L12 and first negative-electrode flow pipe L21 can be omitted. This is also advantageous in that each of second positive-electrode flow pipe L12 and first negative-electrode flow pipe L22 need not necessarily be provided with a valve or the like for switching the flow direction of the fluid.

In this embodiment, although second positive-electrode pump 14 and first negative-electrode pump 23 are omitted with respect to the first embodiment, it will be apparent to a person skilled in the art that first positive-electrode pump 13 and second negative-electrode pump 24 may be omitted.

REFERENCE SIGNS LIST

1 Redox flow battery
2 Cell stack
3 Cell group
4 Cell
5 Positive cell
5a Positive electrode
6 Negative cell
6a Negative electrode
7 Membrane
8 Low-pressure-side pressure-equalizing pipe
9 High-pressure-side pressure-equalizing pipe
11 First positive-electrode tank
12 Second positive-electrode tank
13 First positive-electrode pump
14 Second positive-electrode pump
15 Positive-electrode pressure-equalizing pipe
21 First negative-electrode tank
22 Second negative-electrode tank
23 Second negative-electrode pump
24 Second negative-electrode pump
25 Negative-electrode pressure-equalizing pipe
L11 First positive-electrode flow pipe
L12 Second positive-electrode flow pipe
L21 First negative-electrode flow pipe
L22 Second negative-electrode flow pipe

What is claimed is:

1. A redox flow battery that is charged and discharged through a redox reaction of positive-electrode active material and negative-electrode active material in a cell, the redox flow battery comprising:
   a cell stack including a plurality of cells that are stacked, each of the cells including a positive cell that houses a positive electrode and that is supplied with a positive-electrode fluid containing the positive-electrode active material, and a negative cell that houses a negative electrode and that is supplied with a negative-electrode fluid containing the negative-electrode active material;
   a first positive-electrode tank for storing the positive-electrode fluid having a relatively low state of charge;
   a second positive-electrode tank for storing the positive-electrode fluid having a relatively high state of charge;
   a first negative-electrode tank for storing the negative-electrode fluid having a relatively low state of charge; and
   a second negative-electrode tank storing the negative-electrode fluid having a relatively high state of charge,
   wherein the cell stack is divided into a plurality of cell groups, each of which consists of the plurality of cells,
   wherein the plurality of cell groups are connected to the first positive-electrode tank and the second positive-electrode tank such that the positive-electrode fluid flows in parallel through the plurality of cell groups between the first positive-electrode tank and the second positive-electrode tank, and the plurality of cell groups are connected to the first negative-electrode tank and the second negative-electrode tank such that the negative-electrode fluid flows in parallel through the plurality of cell groups between the first negative-electrode tank and the second negative-electrode tank, and
   wherein the plurality of cells in each of the cell groups are connected to each other such that the positive-electrode fluid, that has flowed into each of the cell groups, passes in series through the plurality of positive cells and then flows out of each of the cell groups, and such that the negative-electrode fluid, that has flowed into each of the cell groups, passes in series through the plurality of negative cells and then flows out of each of the cell groups.

2. The redox flow battery according to claim 1, comprising: a first positive-electrode pump for delivering the positive-electrode fluid in the first positive-electrode tank to the second positive-electrode tank; a second positive-electrode pump for delivering the positive-electrode fluid in the second positive-electrode tank to the first positive-electrode tank; a first negative-electrode pump for delivering the negative-electrode fluid in the first negative-electrode tank to the second negative-electrode tank; and a second negative-electrode pump for delivering the negative-electrode fluid in the second negative-electrode tank to the first negative-electrode tank.

3. The redox flow battery according to claim 1, comprising: a positive-electrode pump for delivering the positive-electrode fluid in the first positive-electrode tank to the second positive-electrode tank; and a negative-electrode pump for delivering the negative-electrode fluid in the first negative-electrode tank to the second negative-electrode tank,
wherein the second positive-electrode tank is positioned above the first positive-electrode tank so that a hydraulic head difference causes a flow of the positive-electrode fluid in the second positive-electrode tank to the first positive-electrode tank, and
wherein the second negative-electrode tank is positioned above the first negative-electrode tank so that a hydraulic head difference causes a flow of the negative-electrode fluid in the second negative-electrode tank to the first negative-electrode tank.

4. The redox flow battery according to claim 3, wherein the redox flow battery is located inside a three or more story building,
wherein the cell stack is installed on a floor above a floor on which the first positive-electrode tank and the first negative-electrode tank are installed, and
wherein the second positive-electrode tank and the second negative-electrode tank are installed on a floor above the floor on which the cell stack is installed.

5. The redox flow battery according to claim 1, wherein the first positive-electrode tank and the second positive-electrode tank are connected by a pressure-equalizing pipe that equalizes a pressure of a gas phase portion in the first positive-electrode tank with a pressure of a gas phase portion in the second positive-electrode tank, and
wherein the first negative-electrode tank and the second negative-electrode tank are connected by a pressure-equalizing pipe that equalizes a pressure of a gas phase portion in the first negative-electrode tank with a pressure of a gas phase portion in the second negative-electrode tank.

6. The redox flow battery according to claim 1, comprising: a positive-electrode pump for delivering the positive-electrode fluid in the first positive-electrode tank to the second positive-electrode tank; and a negative-electrode pump for delivering the negative-electrode fluid in the second negative-electrode tank to the first negative-electrode tank,
wherein a pressure in the second positive-electrode tank is higher than a pressure in the first positive-electrode tank, and a pressure in the first negative-electrode tank is higher than a pressure in the second negative-electrode tank.

7. The redox flow battery according to claim 6, wherein the first positive-electrode tank and the second negative-electrode tank are connected by a pressure-equalizing pipe that equalizes a pressure of a gas phase portion in the first positive-electrode tank with a pressure of a gas phase portion in the second negative-electrode tank, and
wherein the second positive-electrode tank and the first negative-electrode tank are connected by a pressure-equalizing pipe that equalizes a pressure of a gas phase portion in the second positive-electrode tank with a pressure of a gas phase portion in the first negative-electrode tank.

8. The redox flow battery according to claim 6, wherein the second positive-electrode tank is positioned above the first positive-electrode tank so that a hydraulic head difference causes a flow of the positive-electrode fluid in the second positive-electrode tank to the first positive-electrode tank, and
wherein the first negative-electrode tank is positioned above the second negative-electrode tank so that a hydraulic head difference causes a flow of the negative-electrode fluid in the first negative-electrode tank to the second negative-electrode tank.

9. The redox flow battery according to claim 1, comprising: a positive-electrode pump for delivering the positive-electrode fluid in the second positive-electrode tank to the first positive-electrode tank; and a negative-electrode pump for delivering the negative-electrode fluid in the first negative-electrode tank to the second negative-electrode tank,
wherein a pressure in the first positive-electrode tank is higher than a pressure in the second positive-electrode tank, and a pressure in the second negative-electrode tank is higher than a pressure in the first negative-electrode tank.

10. The redox flow battery according to claim 9, wherein the second positive-electrode tank and the first negative-electrode tank are connected by a pressure-equalizing pipe that equalizes a pressure of a gas phase portion in the second positive-electrode tank with a pressure of a gas phase portion in the first negative-electrode tank, and
wherein the first positive-electrode tank and the second negative-electrode tank are connected by a pressure-equalizing pipe that equalizes a pressure of a gas phase portion in the first positive-electrode tank with a pressure of a gas phase portion in the second negative-electrode tank.

11. The redox flow battery according to claim 9, wherein the first positive-electrode tank is positioned above the second positive-electrode tank so that a hydraulic head difference causes a flow of the positive-electrode fluid in the first positive-electrode tank to the second positive-electrode tank, and
wherein the second negative-electrode tank is positioned above the first negative-electrode tank so that a hydraulic head difference causes a flow of the negative-electrode fluid in the second negative-electrode tank to the first negative-electrode tank.

12. The redox flow battery according to claim 1, wherein the plurality of cell groups are connected to each of the tanks through a flow pipe having a shape like a tournament bracket that branches hierarchically from each of the tanks toward the plurality of cell groups.

13. The redox flow battery according to claim 1, wherein the plurality of cells in each of the cell groups are connected to each other such that the positive-electrode fluid and the negative-electrode fluid flow in opposite directions within each of the cells.

14. The redox flow battery according to claim 1, wherein the plurality of cells in each of the cell groups are connected to each other such that the positive-electrode fluid and the negative-electrode fluid flow in the same direction within each of the cells.

15. The redox flow battery according to claim 1, wherein the plurality of cells in each of the cell groups are connected to each other such that the positive-electrode fluid flows into a cell at one end of a cell group and flows out of a cell at the other end of the cell group and such that the negative-electrode fluid flows into the cell at the other end of the cell group and flows out of the cell at the one end of the cell group.

16. The redox flow battery according to claim 1, wherein the plurality of cells in each of the cell groups are connected to each other such that both the positive-electrode fluid and the negative-electrode fluid flow into a cell at one end of a cell group and flow out of a cell at the other end of the cell group.

* * * * *